United States Patent
Baar et al.

(10) Patent No.: US 11,313,786 B2
(45) Date of Patent: Apr. 26, 2022

(54) TESTING SYSTEM FOR DETECTORS USEFUL ON VEHICLES

(71) Applicant: Aptiv Technologies Limited, St. Michael (BB)

(72) Inventors: James C. Baar, Logansport, IN (US); Steven D. Kaufman, Cicero, IN (US); Timothy D. Garner, Cicero, IN (US); Robert R. Bugher, Russiaville, IN (US); Raul Alfonso Zubia Duran, Kokomo, IN (US); Benjamin Dilsaver, Kokomo, IN (US); Az Eddine Farouki, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 177 days.

(21) Appl. No.: 16/781,166

(22) Filed: Feb. 4, 2020

(65) Prior Publication Data
US 2021/0239597 A1     Aug. 5, 2021

(51) Int. Cl.
*G01N 17/00* (2006.01)
*G01M 17/007* (2006.01)
(Continued)

(52) U.S. Cl.
CPC ........... *G01N 17/002* (2013.01); *G01D 18/00* (2013.01); *G01M 17/007* (2013.01); *G01S 7/40* (2013.01); *G01S 7/4086* (2021.05); *G01S 7/497* (2013.01)

(58) Field of Classification Search
CPC ........ G01S 7/40; G01S 7/4004; G01S 7/4082; G01S 7/4086; G01S 7/481; G01S 7/497; G01S 7/4972; G01N 17/002
See application file for complete search history.

(56) References Cited

U.S. PATENT DOCUMENTS 6,114,985 A    9/2000  Russell et al.
9,863,866 B2   1/2018  Bugher et al.
(Continued)

FOREIGN PATENT DOCUMENTS

CN         204925281 U     12/2015

OTHER PUBLICATIONS

Extended European Search Report for Application No. EP 21156098 1.5 dated Jun. 24, 2021.
(Continued)

*Primary Examiner* — Benjamin R Schmitt
(74) *Attorney, Agent, or Firm* — Carlson, Gaskey & Olds, P.C.

(57) ABSTRACT

A detector testing system includes an environmental chamber configured to provide at least one selected environmental condition within the chamber. The environmental chamber includes an opening. A cover over the opening has at least one surface that is at least partially transparent to radiation that the detector is configured to receive. The cover is configured to maintain the at least one selected environmental condition within the environmental chamber. A detector support is configured to support a plurality of detectors exposed to the at least one selected environmental condition in a location within a space defined by the cover where the cover provides a detector field of view through the at least one surface. The detector field of view for each of the detectors has a horizontal range of at least 180°.

21 Claims, 3 Drawing Sheets

(51) Int. Cl.
G01S 7/497 (2006.01)
G01S 7/40 (2006.01)
G01D 18/00 (2006.01)

(56) References Cited

U.S. PATENT DOCUMENTS

2008/0274346 A1* 11/2008 Miller ............... B29C 44/3453
428/315.7
2018/0254208 A1* 9/2018 Chang .................... G01J 5/047
2018/0306903 A1 10/2018 Heuel et al.

OTHER PUBLICATIONS

Gowdu Sreehari Budappagari Jayapal et al: "System architecture for installed-performance testing of automotive radars over-the-air," 2018 IEEE MTT-S International Conference on Microwaves for Intelligent Mobility, IEEE, Apr. 15, 2018, pp. 1-4, XP033391304, DOI: 10.1109/ICMIM.2018.84434490 [retreved on Aug. 21, 2018].

* cited by examiner

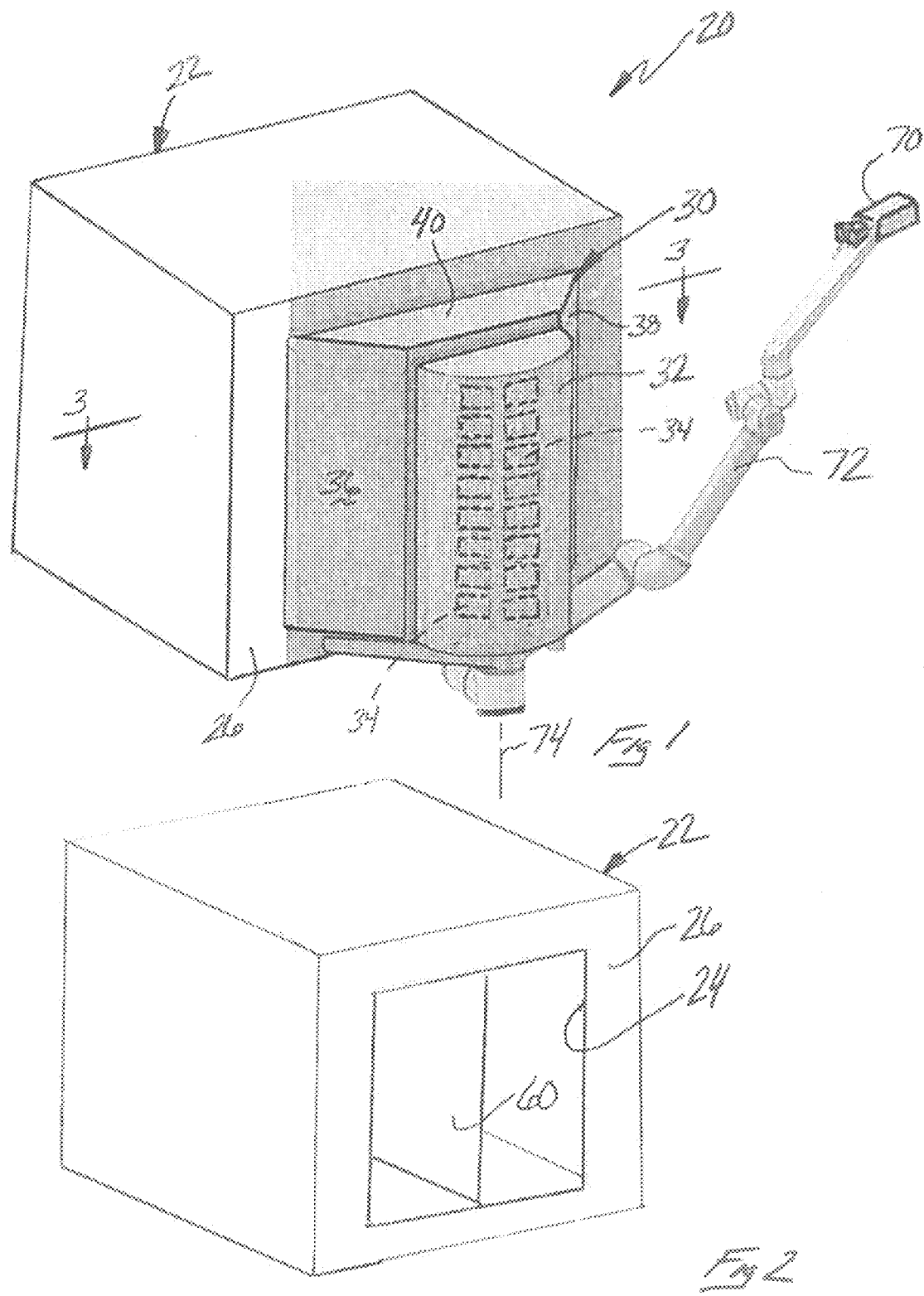

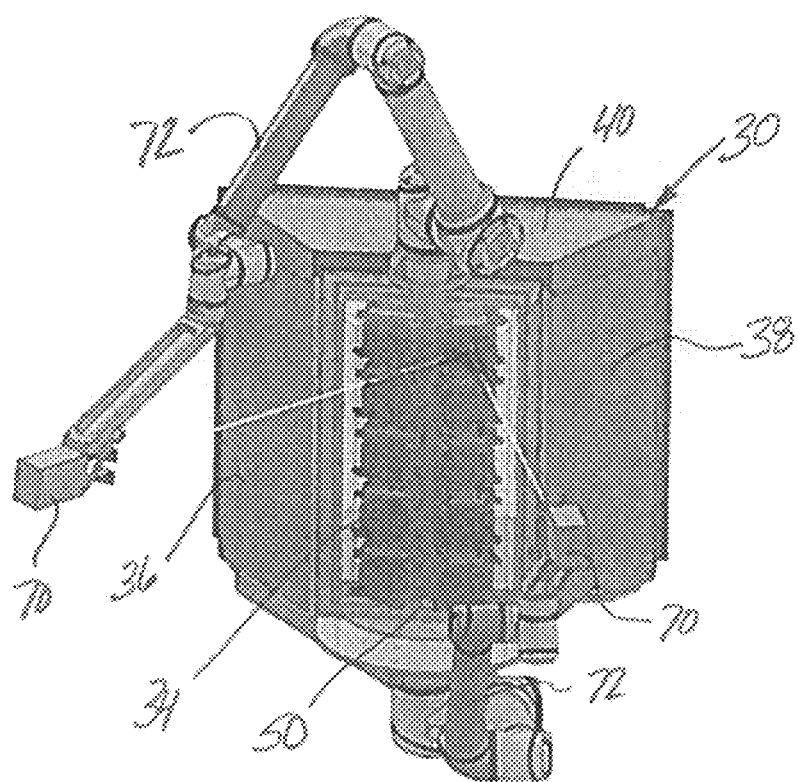

TESTING SYSTEM FOR DETECTORS USEFUL ON VEHICLES

BACKGROUND

Modern automotive vehicles include an increasing amount of electronic technology, such as sensors or detectors that provide driver assistance or autonomous vehicle control. Before such devices are included on vehicles, they go through testing and validation procedures. Special arrangements typically have to be made to conduct such testing.

One drawback associated with existing testing procedures for such sensors is that they require a relatively large enclosed testing area. For example, a testing area may be on the order of ten meters long by four meters wide, which takes up substantial space within a building or facility. The interior of the enclosed testing area is typically lined with a special material to avoid unwanted reflections that may interfere with the testing and validation procedure. Additionally, known testing areas place limits on the ability to achieve test results corresponding to a desired range of conditions. The size of the testing area places limits on how far a reflective target can be situated relative to a sensor device under test. The distance-to-target range is limited by the size of the enclosed testing area. Additionally, the horizontal field of view of a sensor being tested is typically limited to an angular range that is less than the range that is desired when the sensor is mounted on a vehicle.

SUMMARY

An illustrative example embodiment of a detector testing system includes an environmental chamber configured to provide at least one selected environmental condition within the chamber. The environmental chamber includes an opening. A cover over the opening has at least one surface that is at least partially transparent to radiation that the detector is configured to receive. The cover is configured to maintain the at least one selected environmental condition within the environmental chamber. A detector support is configured to support a plurality of detectors exposed to the at least one selected environmental condition in a location within a space defined by the cover where the cover provides a detector field of view through the at least one surface. The detector field of view for each of the detectors has a horizontal range of at least 180°.

In an example embodiment having one or more features of the detector testing system of the previous paragraph, the at least one surface of the cover is curved.

In an example embodiment having one or more features of the detector testing system of any of the previous paragraphs, the at least one surface of the cover has a uniform thickness within the detector field of view.

In an example embodiment having one or more features of the detector testing system of any of the previous paragraphs, the at least one surface of the cover comprises a foam material.

In an example embodiment having one or more features of the detector testing system of any of the previous paragraphs, the cover comprises a plurality of sidewalls supporting the at least one surface, the opening is within a first plane, the sidewalls are oriented at an oblique angle relative to the first plane, and the at least one surface is at least partially in a second plane spaced from the first plane.

In an example embodiment having one or more features of the detector testing system of any of the previous paragraphs, the at least one surface comprises a first material and the sidewalls comprise a second, different material.

An example embodiment having one or more features of the detector testing system of any of the previous paragraphs includes a target that is configured to direct the radiation toward the at least one surface. The target is moveable into a plurality of positions within the detector field of view.

An example embodiment having one or more features of the detector testing system of any of the previous paragraphs includes a robot arm supporting the target. The robot arm is controllable to move the target into the plurality of positions.

In an example embodiment having one or more features of the detector testing system of any of the previous paragraphs, the target comprises a simulator that generates the radiation and emits the radiation toward the at least one surface.

In an example embodiment having one or more features of the detector testing system of any of the previous paragraphs, the simulator generates the radiation in a manner that the radiation appears to be reflected off an object that is further from the at least one surface than a distance between the simulator and the at least one surface.

In an example embodiment having one or more features of the detector testing system of any of the previous paragraphs, the detector support comprises a first portion that supports a first set detectors of the plurality of detectors at a first oblique angle relative to the opening and a second portion that supports a second set of detectors of the plurality of detectors at a second oblique angle relative to the opening.

In an example embodiment having one or more features of the detector testing system of any of the previous paragraphs, the first and second oblique angles of are such that an angle between lines normal to faces of the first and second sets of detectors 34 is greater than 180□ in a horizontal plane.

In an example embodiment having one or more features of the detector testing system of any of the previous paragraphs, a portion of the detector field of view of the first set of detectors overlaps the detector field of view of the second set of detectors.

In an example embodiment having one or more features of the detector testing system of any of the previous paragraphs, the first portion of the detector support comprises a first rack configured to support the first set of detectors in a first column, the detector field of view of each of the detectors in the first set of detectors has a vertical range of at least 10°, the second portion of the detector support comprises a second rack configured to support the second set of detectors in a second column, and the detector field of view of each of the detectors in the second set of detectors has a vertical range of at least 10°.

In an example embodiment having one or more features of the detector testing system of any of the previous paragraphs, the environmental chamber includes at least one duct that directs airflow through the opening toward the space.

In an example embodiment having one or more features of the detector testing system of any of the previous paragraphs, the at least one surface includes a curvature that directs the airflow from the space toward the opening.

An illustrative example embodiment of a method of operating a detector testing system, comprising, providing at least one selected environmental condition within an environmental chamber, the environmental chamber including an opening, maintaining at least one selected environmental condition within the environmental chamber with a cover over the opening, the cover having at least one surface that is at least partially transparent to radiation that the detector is configured to receive, and exposing, a plurality of detectors on a detector support, to the at least one selected environmental condition in a location within a space defined by the cover where the cover provides a detector field of view through the at least one surface, the detector field of view for each of the detectors having a horizontal range of at least 180°.

In an example embodiment having one or more features of the method of operating the detector testing system of the previous paragraph, the detector testing system further comprises a target that is configured to direct the radiation toward the at least one surface, the target being moveable into a plurality of positions within the detector field of view.

In an example embodiment having one or more features of the method of operating the detector testing system of any of the previous paragraphs, the detector testing system further comprises comprising a robot arm supporting the target, the robot arm being controllable to move the target into the plurality of positions.

In an example embodiment having one or more features of the method of operating the detector testing system of any of the previous paragraphs, the target comprises a simulator that generates the radiation and emits the radiation toward the at least one surface.

In an example embodiment having one or more features of the method of operating the detector testing system of any of the previous paragraphs, the simulator generates the radiation in a manner that the radiation appears to be reflected off an object that is further from the at least one surface than a distance between the simulator and the at least one surface.

The various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 1 diagrammatically illustrates a detector testing system.

FIG. 2 illustrates selected features of the example embodiment of FIG. 1.

FIG. 4 shows selected portions of an example embodiment of a detector testing system.

DETAILED DESCRIPTION

Figure 3:
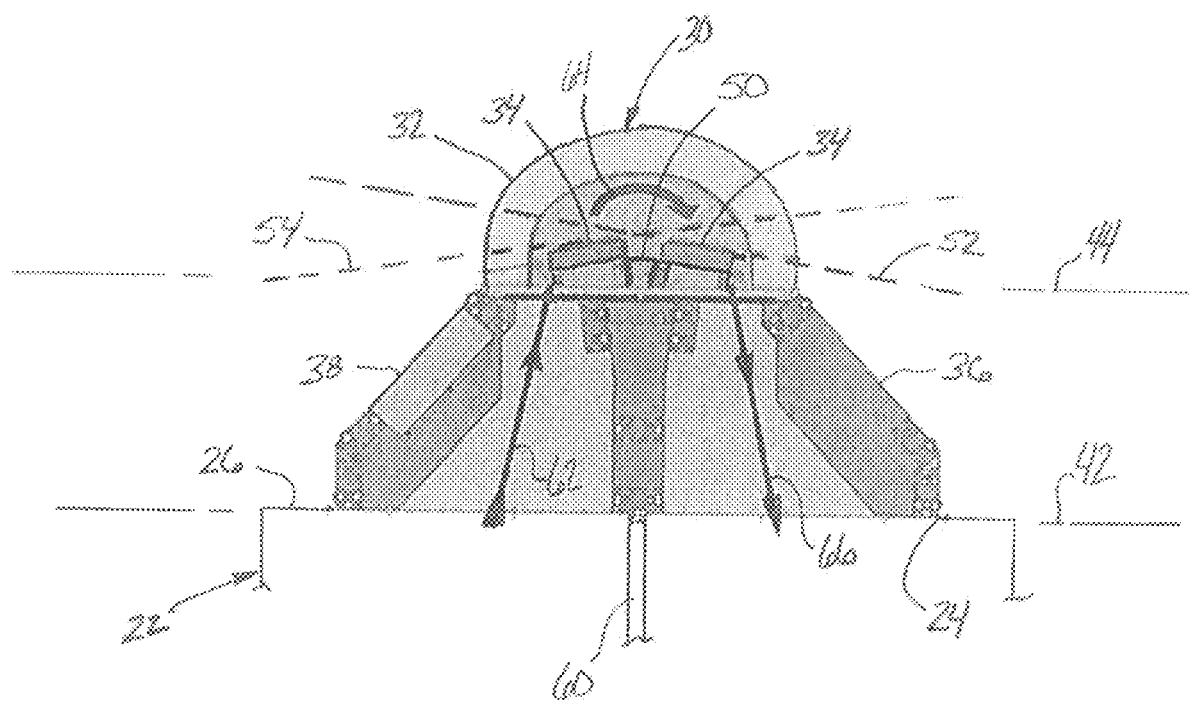
FIG. 3 is a cross-sectional illustration taken along the lines 3-3 in FIG. 1.

FIG. 1 diagrammatically illustrates a detector testing system 20. An environmental chamber 22 is configured to establish at least one selected environmental condition, such as temperature or humidity, within the environmental chamber 22. As can be appreciated from FIG. 2, the environmental chamber 22 includes an opening 24 in at least one sidewall 26. As shown in FIG. 1, a cover 30 covers over the opening 24 when it is received against the sidewall 26. The cover 30 defines an interior space that is exposed to or includes the environmental condition within the environmental chamber 22. The cover 30 maintains the environmental condition within the interior space of the cover 30 so that it corresponds to or is the same as the environmental condition established within the environmental chamber 22.

The cover 30 includes at least one surface 32 that is at least partially transparent to radiation that is used for testing detectors 34. For example, when the detectors 34 are RADAR detectors, the surface 32 is transparent to the radio frequency electromagnetic waves that the detectors 34 are configured to receive. In one such example embodiment, the surface 32 comprises a rigid polyurethane foam. The material of the surface 32 maintains the desired environmental condition within the interior space of the cover 30 and the environmental chamber 22 while allowing for at least a selected type of radiation to sufficiently pass through the surface 32 to be detected by at least one of the detectors 34.

One aspect of the surface 32 is that it can be considered a radome in that it provides a covering over the detectors 34. The surface 32 or radome maintains control over the environmental conditions to which the detectors 34 are exposed while also allowing the appropriate type of radiation to reach the detectors 34. While many radomes are used to protect detectors from harsh environmental conditions, the radome or surface 32 in the illustrated testing system 20 serves to expose the detectors 34 to intended testing environmental conditions.

Depending on the type of detectors 34 that are undergoing testing and the corresponding type of radiation, the material of the surface 32 may vary provided that it is sufficiently transparent to the appropriate type of radiation while maintaining the desired environmental conditions provided by the environmental chamber 22.

In the illustrated example, the cover 30 includes a plurality of sidewalls 36, 38 and 40. The sidewalls 36, 38 and 40 are each oriented at an oblique angle relative to a first plane 42 (FIG. 3) in which the opening 24 is situated. The sidewalls 36, 38 and 40 support the surface 32 so that it is situated outside of the plane 42 and, in the illustrated example, forward of the opening 24. The example surface 32 is at least partially situated in a second plane 44 that does not intersect the first plane 42, as shown in FIG. 3.

As can be appreciated from FIGS. 1 and 3, the surface 32 is curved and has a uniform thickness along the direction that radiation will pass through to be detected by at least one of the detectors 34. The uniform thickness minimizes or eliminates any variation in distortion or absorption of radiation passing through the surface 32 toward a detector 34.

The position of the surface 32 forward of the opening 24 and the configuration of the cover 30 establishes a space within which the detectors 34 are positioned so that the surface 32 provides a field of view for the detectors 34 that has a horizontal range of at least 180°. The illustrated example embodiment includes a support 50 situated within the space inside of the cover 30. In this example, the support 50 is configured to support a plurality of detectors 34 in two columns. A first set of the detectors 34 in a first column is situated at an oblique angle relative to the first plane 42 that contains the opening 24. A second set of the detectors 34 is situated in a second column at another oblique angle relative to the plane 42. The oblique angles of the first column and the second column are such that an angle between lines normal to faces of the first and second sets of detectors 34 is greater than 180—in a horizontal plane. As shown in FIG. 3, the angle being greater than 180—enables an unobstructed field of view for the detectors 34 supported in the first and second columns.

As shown in FIG. 3, the first set of detectors 34 have a field of view with a horizontal range of at least 180° as represented by the broken line 52. The second set of detectors 34 has a field of view with a horizontal range of at least 180° as represented by the broken line 54 in FIG. 3. As can be appreciated from the illustration, the field of view of the first set of detectors 34 at least partially overlaps with the field of view of the second set of detectors 34. The location of the surface 32 relative to the opening 24 and the shape of the surface 32, which is curved in the illustrated example embodiment, combined with the position of the detectors 34 relative to the surface 32 provides the desired horizontal range of the detector field of view.

As shown in FIGS. 2 and 3, the environmental chamber 22 includes at least one duct 60 that is configured for directing airflow between the interior of the environmental chamber 22 and the space within the cover 30. In this example embodiment, the duct 60 facilitates airflow represented by the arrows 62 into the space defined within the interior of the cover 30. The inside of the surface 32 facilitates airflow passing over the detectors 34 as schematically represented by the arrow 64 before it continues back into the interior of the environmental chamber 22 as represented by the arrows 66. This type of airflow arrangement ensures that the detectors 34 are exposed to the environmental condition established within the environmental chamber 22.

The detector testing system 20 shown in FIG. 1 includes a target simulator 70 that is configured to emit radiation toward the detectors 34. The target simulator 70 operates in a known manner to generate radiation that imitates or simulates the manner in which radiation reflects off of a target object before being detected by at least one of the detectors 34. The target simulator 70 serves as a target that directs radiation toward the detectors 34.

The illustrated example embodiment includes a robot arm 72 that supports the target simulator 70 in a manner that allows for the target simulator 70 to be placed in a variety of positions within the field of view of the detectors 34. In this example, a base of the robot arm 72 is situated so that a primary axis 74 of the robot arm is centered beneath the cover 30. Other embodiments include different mechanisms for situating at least one target within the field of view of the detectors 34. The illustrated arrangement provides a compact and versatile testing system 20 that occupies much less space compared to previous testing configurations. The target simulator 70 is configured to emit radiation that resembles radiation reflected from targets at various distances from the detectors 34. The target simulator 70 can, for example, simulate reflected radiation from 10 meters or 50 meters away while in the same physical location relative to the detectors 34. Additionally, the use of a simulator as the target eliminates the need for an enclosed testing space having anti-reflective material within that enclosure because the target simulator 70 is capable of directing radiation specifically toward the surface 32 and stray or inadvertent reflections are not a concern.

FIG. 4 illustrates an example configuration with the surface 32 removed so that the support 50 and the detectors 34 are visible in FIG. 4. In this example arrangement, multiple target simulators 70 are supported on respective robot arms 72.

With the illustrated example testing system 20 it is possible to test detectors, such as RADAR or LIDAR detectors under a variety of environmental conditions within a relatively small space. The testing can be conducted with a detector field of view that has a horizontal range of at least 180°. The example support 50 supports the detectors 34 in columns so that the field of view of each detector has a vertical range of at least 20°. The target simulators 70 allow for testing the detectors with a target at a distance of up to 300 meters away, even though the target simulator 70 is much closer to the detectors 34.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A detector testing system, comprising:
   an environmental chamber configured to provide at least one selected environmental condition within the environmental chamber, the environmental chamber including an opening;
   a cover over the opening, the cover having at least one surface that is at least partially transparent to radiation that the detector is configured to receive, the cover being configured to maintain the at least one selected environmental condition within the environmental chamber; and
   a detector support that is configured to support a plurality of detectors within the environmental chamber and exposed to the at least one selected environmental condition in a location within a space defined by the cover where the cover provides a detector field of view through the at least one surface, the detector field of view for each of the detectors having a horizontal range of at least 180°.

2. The detector testing system of claim 1, wherein the at least one surface of the cover is curved.

3. The detector testing system of claim 2, wherein the at least one surface of the cover has a uniform thickness within the detector field of view.

4. The detector testing system of claim 1, wherein the at least one surface of the cover comprises a foam material.

5. The detector testing system of claim 1, wherein
   the cover comprises a plurality of sidewalls supporting the at least one surface;
   the opening is within a first plane;
   the sidewalls are oriented at an oblique angle relative to the first plane; and
   the at least one surface is at least partially in a second plane spaced from the first plane.

6. The detector testing system of claim 1, comprising a target that is configured to direct the radiation toward the at least one surface, the target being moveable into a plurality of positions within the detector field of view.

7. The detector testing system of claim 6, comprising a robot arm supporting the target, the robot arm being controllable to move the target into the plurality of positions.

8. The detector testing system of claim 6, wherein the target comprises a simulator that generates the radiation and emits the radiation toward the at least one surface.

9. The detector testing system of claim 8, wherein the simulator generates the radiation in a manner that the radiation appears to be reflected off an object that is further from the at least one surface than a distance between the simulator and the at least one surface.

10. The detector testing system of claim 1, wherein the detector support comprises a first portion that supports a first set of detectors of the plurality of detectors at a first oblique angle relative to the opening and a second portion that supports a second set of detectors of the plurality of detectors at a second oblique angle relative to the opening.

11. The detector testing system of claim 10, wherein the first and second oblique angles are such that an angle between lines normal to faces of the first and second sets of detectors is greater than 180° in a horizontal plane.

12. The detector testing system of claim 10, wherein a portion of the detector field of view of the first set of detectors overlaps the detector field of view of the second set of detectors.

13. The detector testing system of claim 10 wherein
the first portion of the detector support comprises a first rack configured to support the first set of detectors in a first column;
the detector field of view of each of the detectors in the first set of detectors has a vertical range of at least 10°;
the second portion of the detector support comprises a second rack configured to support the second set of detectors in a second column; and
the detector field of view of each of the detectors in the second set of detectors has a vertical range of at least 10°.

14. The detector testing system of claim 1, wherein the environmental chamber includes at least one duct that directs airflow through the opening toward the space.

15. The detector testing system of claim 14, wherein the at least one surface includes a curvature that directs the airflow from the space toward the opening.

16. A method of operating a detector testing system, comprising:
providing at least one selected environmental condition within an environmental chamber, the environmental chamber including an opening;
maintaining at least one selected environmental condition within the environmental chamber with a cover over the opening, the cover having at least one surface that is at least partially transparent to radiation that the detector is configured to receive; and
exposing a plurality of detectors on a detector support within the environmental chamber to the at least one selected environmental condition in a location within a space defined by the cover where the cover provides a detector field of view through the at least one surface, the detector field of view for each of the detectors having a horizontal range of at least 180°.

17. The method of claim 16, wherein the detector testing system further comprises a target that is configured to direct the radiation toward the at least one surface, the target being moveable into a plurality of positions within the detector field of view.

18. The method of claim 17, wherein the detector testing system further comprises a robot arm supporting the target, the robot arm being controllable to move the target into the plurality of positions.

19. The method of claim 17, wherein the target comprises a simulator that generates the radiation and emits the radiation toward the at least one surface.

20. The method of claim 19, wherein the simulator generates the radiation in a manner that the radiation appears to be reflected off an object that is further from the at least one surface than a distance between the simulator and the at least one surface.

21. A detector testing system, comprising:
an environmental chamber configured to provide at least one selected environmental condition within the environmental chamber, the environmental chamber including an opening;
a cover over the opening, the cover having at least one surface that is at least partially transparent to radiation that the detector is configured to receive, the cover being configured to maintain the at least one selected environmental condition within the environmental chamber;
a detector support that is configured to support a plurality of detectors exposed to the at least one selected environmental condition in a location within a space defined by the cover where the cover provides a detector field of view through the at least one surface, the detector field of view for each of the detectors having a horizontal range of at least 180°;
the cover comprises a plurality of sidewalls supporting the at least one surface;
the opening is within a first plane;
the sidewalls are oriented at an oblique angle relative to the first plane;
the at least one surface is at least partially in a second plane spaced from the first plane;
the at least one surface comprises a first material; and
the sidewalls comprise a second, different material.

* * * * *